United States Patent
Fogel et al.

(10) Patent No.: US 7,958,079 B2
(45) Date of Patent: *Jun. 7, 2011

(54) INTELLIGENTLY INTERACTIVE PROFILING SYSTEM AND METHOD

(75) Inventors: David B. Fogel, San Diego, CA (US); Gary B. Fogel, San Diego, CA (US)

(73) Assignee: Natural Selection, Inc., San Diego, CA (US)

( * ) Notice: Subject to any disclaimer, the term of this patent is extended or adjusted under 35 U.S.C. 154(b) by 101 days.

This patent is subject to a terminal disclaimer.

(21) Appl. No.: 12/407,749

(22) Filed: Mar. 19, 2009

(65) Prior Publication Data

US 2009/0319346 A1    Dec. 24, 2009

Related U.S. Application Data

(63) Continuation of application No. 10/527,509, filed as application No. PCT/US03/28446 on Sep. 10, 2003, now Pat. No. 7,526,467.

(60) Provisional application No. 60/410,905, filed on Sep. 13, 2002.

(51) Int. Cl.
   *G06F 15/00* (2006.01)
   *G06F 15/18* (2006.01)

(52) U.S. Cl. ........................................... 706/62

(58) Field of Classification Search ............ 706/62
   See application file for complete search history.

(56) References Cited

U.S. PATENT DOCUMENTS

| | | | |
|---|---|---|---|
| 4,912,654 A | 3/1990 | Wood | |
| 5,124,918 A | 6/1992 | Beer et al. | |
| 5,214,715 A | 5/1993 | Carpenter et al. | |
| 5,222,194 A | 6/1993 | Nishimura | |
| 5,410,634 A | 4/1995 | Li | |
| 5,469,692 A | 11/1995 | Xanthopoulos | |
| 5,735,429 A | 4/1998 | Whitworth | |
| 5,802,506 A | 9/1998 | Hutchison | |
| 5,829,594 A | 11/1998 | Warder | |
| 5,842,524 A | 12/1998 | Farmer | |
| 5,857,502 A | 1/1999 | Buchalter | |
| 5,978,785 A | 11/1999 | Johnson et al. | |
| 6,006,223 A | 12/1999 | Agrawal et al. | |
| 6,038,556 A | 3/2000 | Hutchison | |
| 6,131,110 A | 10/2000 | Bates et al. | |
| 6,144,954 A | 11/2000 | Li | |
| 6,250,236 B1 | 6/2001 | Feizollahi | |
| 6,308,172 B1 | 10/2001 | Agrawal et al. | |
| 6,328,160 B1 | 12/2001 | Cooksey | |
| 6,499,602 B2 | 12/2002 | Yajima et al. | |

(Continued)

OTHER PUBLICATIONS

The Status and Future of Medical and Industrial Accelerator Technologies Stark, R.; Vacuum Electronics Conference, 2007. IVEC '07 IEEE International May 15-17, 2007 pp. 1-4 Digital Object Identifier 10.1109/IVELEC.2007.4283193.

(Continued)

*Primary Examiner* — Michael Holmes
(74) *Attorney, Agent, or Firm* — Timothy N. Ellis

(57) ABSTRACT

One aspect of the invention is a method for identifying at least one property of data. An example of the method includes receiving data, and making assessments regarding the data. The method also includes applying at least one behavioral operator, and outputting results. The method further comprises receiving feedback concerning system performance. Additionally, the method includes adjusting at least one parameter based on the feedback received concerning system performance, wherein the at least one parameter is a parameter of a machine learning method.

62 Claims, 6 Drawing Sheets

U.S. PATENT DOCUMENTS

| | | |
|---|---|---|
| 6,622,004 B1 | 9/2003 | Sonoda et al. |
| 6,662,941 B2 | 12/2003 | Lowry et al. |
| 6,705,817 B2 | 3/2004 | Wittenstein et al. |
| 6,755,304 B2 | 6/2004 | Ryals |
| 6,868,982 B2 | 3/2005 | Gordon |
| 6,965,314 B2 | 11/2005 | Bohinc, Jr. |
| 7,002,472 B2 | 2/2006 | Stratmoen et al. |
| 7,012,529 B2 | 3/2006 | Sajkowsky |
| 7,114,376 B2 | 10/2006 | Loucks et al. |
| 7,151,447 B1 | 12/2006 | Willms et al. |
| 7,175,021 B2 | 2/2007 | Colombo |
| 7,176,800 B2 | 2/2007 | Sajkowsky |
| 7,190,265 B1 | 3/2007 | Bohinc, Jr. |
| 7,235,063 B2 | 6/2007 | D'Antonio et al. |
| 7,275,235 B2 | 9/2007 | Molinari et al. ............... 717/100 |
| 7,324,921 B2 | 1/2008 | Sugahara et al. |
| 7,343,303 B2 | 3/2008 | Meyer et al. |
| 7,394,381 B2 | 7/2008 | Hanson et al. |
| 7,441,425 B2 | 10/2008 | Jeong |
| 7,467,091 B2 | 12/2008 | Irwin |
| 7,526,467 B2 | 4/2009 | Fogel .............................. 706/62 |
| 7,650,324 B2 | 1/2010 | Dhairyawan et al. .......... 715/215 |
| 7,657,550 B2 | 2/2010 | Prahlad et al. ......... 707/999.101 |
| 7,660,807 B2 | 2/2010 | Prahlad et al. ......... 707/999.101 |
| 7,703,040 B2 | 4/2010 | Cutrell et al. ................. 715/792 |
| 7,730,150 B2 | 6/2010 | Warren et al. ................. 709/206 |
| 7,747,579 B2 | 6/2010 | Prahlad et al. ................ 707/672 |
| 7,788,589 B2 | 8/2010 | Frankel et al. ................ 715/752 |
| 7,801,864 B2 | 9/2010 | Prahlad et al. ................ 707/667 |
| 7,849,059 B2 | 12/2010 | Prahlad et al. ................ 707/648 |

OTHER PUBLICATIONS

PCT International Search Report, International App. No. PCT/US03/28446, mailing date Apr. 1, 2004, 4 pages.

"US Government Awards $1.9 Million for Global Container Profiling Project", press release, Oct. 21, 2003, 3 pages, Natural Selection, Inc., La Jolla, U.S.A.

Fogel, David B., declaration, Jun. 28, 2005, 2 pages.

PCT, International Preliminary Report on Patentability and corresponding Notification of Transmittal of International Preliminary Report on Patentability, International App. No. PCT/US03/28446, mailing date Jul. 13, 2005, 4 pages.

INTELLIGENTLY INTERACTIVE PROFILING SYSTEM AND METHOD

CROSS-REFERENCE TO RELATED APPLICATIONS

This application is a continuation of U.S. patent application Ser. No. 10/527,509, filed Mar. 10, 2005, now U.S. Pat. No. 7,526,467 titled, "Intelligently Interactive Profiling System and Method", which is incorporated herein by this reference, which is the National Stage of International Application No. PCT/US03/28446, filed Sep. 10, 2003, titled "Intelligently Interactive Profiling System and Method", which is incorporated herein by this reference, which claims the benefit of U.S. Provisional Patent Application No. 60/410,905, filed Sep. 13, 2002, titled, "An Intelligently Interactive Profiling System", which is incorporated herein by this reference.

BACKGROUND

1. Technical Field

The present invention relates to identifying at least one property of data. More particularly, the invention concerns an intelligently interactive system for identifying at least one property of data.

2. Description of Related Art

It is frequently useful to profile data. For example, data may be profiled to determine the expected risk of fraud in a credit card transaction, or the risk of terrorism that a freight shipment poses, or the risk that a patient has a serious medical condition. Data profiling can also be applied to ascertain the chances that a viewer will enjoy a movie, the chances that a person will be compatible with another person in a dating service database, or the chances that a stock will go up or down as the result of set of economic conditions.

Known methods of profiling data may involve applying behavioral rules prescribed by human experts to the data. As an example, a behavioral rule could assign a high level of risk of fraud to a credit card transaction, if the credit card used for the transaction has been reported lost. As another example, a behavioral rule could assign a high level of terrorism risk to a shipping container, if a high level of radioactivity is measured outside the container.

One shortcoming of using only behavioral rules prescribed by human experts for profiling data is that the experts may have insufficient knowledge to prescribe rules. Other shortcomings of using only rules prescribed by human experts are that the experts may erroneously prescribe incorrect rules, or may prescribe conflicting rules. Another shortcoming is that humans typically cannot quickly develop rules, and are slow to react when there is a need to change rules. Yet another shortcoming is that over time, the number of rules prescribed by human experts may grow very large and may require a long time to process, which could result in the profiling being too slow for many applications. For example, a method for profiling data to determine the risk of fraud for a credit card transaction must be able to be completed within several seconds in order to be useful for many applications. Another shortcoming of using only rules prescribed by human experts is that some of the rules may be difficult or impossible to implement. Existing methods for profiling data have additional shortcomings, such as not having an automatic feedback loop for improving the rules prescribed by human experts, and not being reactive or proactive to the user.

Existing methods for profiling data that utilize machine learning in the form of neural networks merely function as black boxes that produce an output, and also are not reactive or proactive to the user. The lack of user feedback in these methods limits the accuracy of the results, and limits the capability of these methods to adapt to changed circumstances or to correct errors. Further, existing methods that utilize machine learning rely excessively on supervised learning, which may limit the accuracy and usefulness of the results in cases where feedback is limited or nonexistent.

In summary, existing methods for profiling data are inadequate for many applications.

SUMMARY

One aspect of the present invention concerns a method for identifying at least one property of data. An example of the method includes the operations of receiving data, and making assessments regarding the data. The method also includes applying at least one behavioral operator, and outputting results. The method further comprises receiving feedback concerning system performance. Additionally, the method includes adjusting at least one parameter based on the feedback received concerning system performance, wherein the at least one parameter is a parameter of a machine learning method.

Other aspects of the invention are described in the sections below, and include, for example, a profiling system, and a signal bearing medium tangibly embodying a program of machine-readable instructions executable by a digital processing apparatus to perform a method for identifying at least one property of data.

The invention provides a number of advantages. For example, some examples of the invention advantageously adjust at least one parameter of a machine learning method, based on feedback received from a user. The invention also provides a number of other advantages and benefits, which should be apparent from the following description.

DETAILED DESCRIPTION

Figure 1:
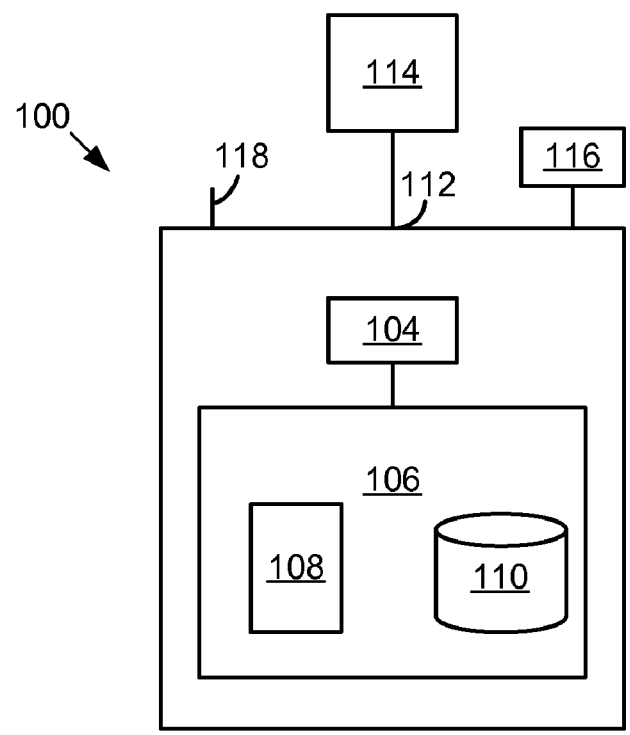
FIG. 1 is a block diagram of the hardware components and interconnections of a system for identifying at least one property of data, in accordance with an example of the invention.

The nature, objectives, and advantages of the invention will become more apparent to those skilled in the art after considering the following detailed description in connection with the accompanying drawings.

I. Hardware Components and Interconnections

One aspect of the invention is a system for identifying at least one property of data. The at least one property of the data may be associated with profiling the data. As an example, the system may be embodied by the hardware components and interconnections of the computing system shown in FIG. 1, which will be referred to as the profiling system 100.

The profiling system 100 includes a processor 104 coupled to a storage 106. The storage 106 includes a memory 108 and a nonvolatile memory 110. As an example, the memory 108 may be RAM. The nonvolatile memory 110 may comprise, for example, one or more magnetic data storage disks such as a hard drive, an optical drive, a tape drive, or any other suitable storage device. The storage 106 may store programming instructions executed by the processor 104. The profiling system 100 also includes an output 112, and may also include a display 114 that is coupled to the output 112. A keyboard 116 may also be included in the profiling system 100. The profiling system 100 also includes an input/output 118, such as a line, bus, cable, electromagnetic link, or other means for the profiling system 100 to send or receive data from external to the profiling system 100. As an example, data may be inputted to the profiling system 100 via the input/output 118.

The profiling system 100 may be implemented by any suitable computing apparatus, such as, for example, a super computer, a mainframe computer, a computer workstation, a personal computer, a cluster of computing devices, or a grid of computing devices connected over a LAN or WAN. Classified or proprietary data should be stored on a secure machine, and in the case of a cluster or grid, should be stored on a secure network. In one example, the profiling system 100 is a personal computer with an Intel processor running the Windows operating system, having the maximum available computing power and data access rates, and having the capability to back up data.

The profiling system may be implemented in a machine of different construction than the profiling system 100 described above, without departing from the scope of the invention. As an example, the memory 108 or the nonvolatile memory 110 may be eliminated, or the storage 106 could be provided on-board the processor 104, or the storage 106 could be provided remotely from the processor 104.

II. Operation

In addition to the various hardware embodiments described above, another aspect of the invention concerns a method for identifying at least one property of data.

A. Signal-Bearing Media

In the context of FIG. 1, the method may be implemented, for example, by operating the profiling system 100 to execute a sequence of machine-readable instructions, which can also be referred to as code. These instructions may reside in various types of signal-bearing media. In this respect, one aspect of the present invention concerns a programmed product, comprising a signal-bearing medium or signal-bearing media tangibly embodying a program of machine-readable instructions executable by a digital processing apparatus to perform a method for identifying at least one property of data.

Figure 2:
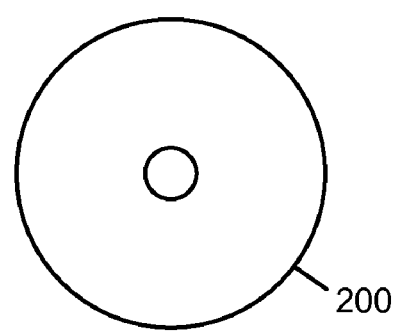
FIG. 2 is an example of a signal-bearing medium in accordance an example of the invention.

This signal-bearing medium may comprise, for example, the memory 108 or the nonvolatile memory 110. Alternatively, the instructions may be embodied in a signal-bearing medium such as the optical data storage disc 200 shown in FIG. 2. The optical disc could be any type of signal bearing disc, for example, a CD-ROM, CD-R, CD-RW, WORM, DVD-R, DVD+R, DVD-RW, or DVD+RW. Whether contained in the profiling system 100 or elsewhere, the instructions may be stored on any of a variety of machine-readable data storage mediums or media, which may include, for example, direct access storage (such as a conventional "hard drive", a RAID array, or a RAMAC), a magnetic data storage diskette (such as a floppy disk), magnetic tape, digital optical tape, RAM, ROM, EPROM, EEPROM, flash memory, magneto-optical storage, paper punch cards, or any other suitable signal-bearing media, including transmission media such as digital and/or analog communications links, which may be electrical, optical, and/or wireless. As an example, the machine-readable instructions may comprise software object code, compiled from a language such as "C++".

B. Operational Modules of Profiling System

Figure 3:
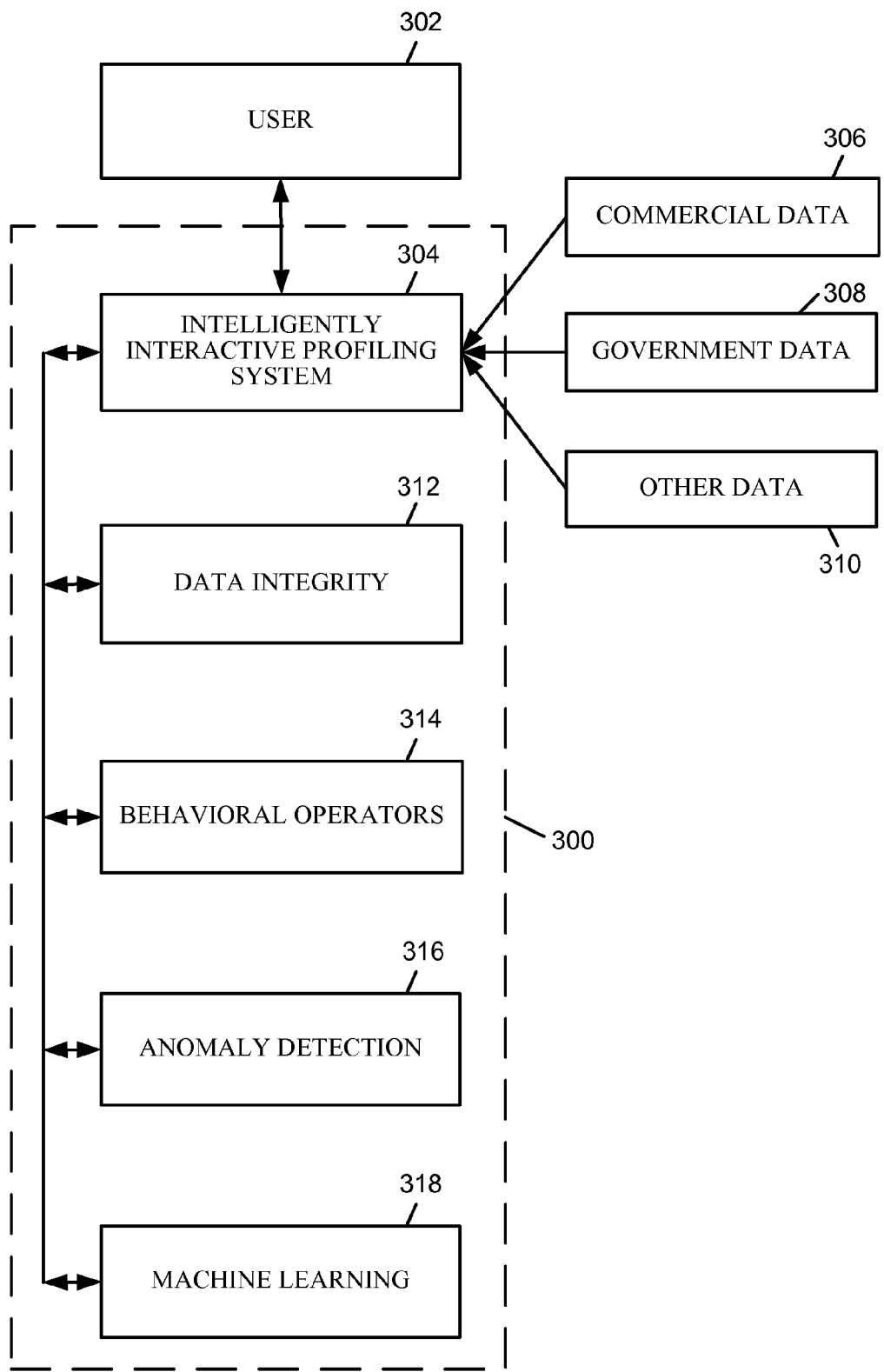
FIG. 3 is a block diagram illustrating interactions between functional elements of a system for identifying at least one property of data, and interactions between the system and a user, and data sources, in accordance an example of the invention.

FIG. 3 is a block diagram illustrating interactions between functional elements of a profiling system 300, and interactions between the profiling system 300 and a user 302 and data sources 306, 308, 310. The profiling system may, for example, perform a method for identifying at least one property of data. The profiling system 300 may be called an intelligently interactive profiling system.

As an example, the profiling system 300 may be implemented by a software program that may run on the profiling system 100 described above. The program may be embodied in signal-bearing media, as discussed above. The profiling system 300 includes an interface/control module 304 that may receive input from the user 302 and present output to the user 302. The interface/control module 304 also may receive data from one or more data sources including a commercial data source 306, a government data source 308, and/or other data sources 310. The interface/control module 304 is coupled to a data integrity module 312 which examines the integrity of the data received by the interface/control module 304. The interface/control module 304 is also coupled to a behavioral operators module 314, which generates and evaluates behavioral operators used by the profiling system 300. The behavioral operators module 314 may be further configured to adjust one or more behavioral operators, and to add new behavioral operators, based on feedback received regarding the outputted results. An anomaly detection module 316, for detecting anomalies in the data, is also coupled to the interface/control module 304. The interface/control module 304 is also coupled to a machine learning module 318, which performs machine learning, such as supervised and/or unsupervised learning, which may be performed during the process of identifying at least one property of data (which in some examples may be a process for interactive profiling). The interface/control module 304 may receive feedback regarding outputted results from the user 302. The interface/control module 304 may also receive feedback concerning system performance from the user 302, and may adjust parameters based on the feedback received concerning system performance. The interface/control module 304 may also proactively generate at least one suggestion and output the at least one suggestion to the user 302, and solicit feedback from the user 302 concerning the generated suggestions. The interface/control module 304 may also receive feedback concerning the generated suggestions, and interpret the feedback received concerning the generated suggestions. The operation of the profiling system 300 is discussed further below.

C. Overall Sequence of Operation

An example of the method aspect of the invention is a method for identifying at least one property of an item(s), individual(s), or other data. The properties identified may be desired properties and/or undesired properties. In some embodiments, the method may be referred to as a method for profiling multiple items and/or individuals and outputting results regarding the items and/or individuals, in an intuitive, user-friendly manner. A user may first identify a problem, which may be a recognized deficiency between a current state and a desired state, and a performance measure may be constructed to capture the preferences of outcomes. In general, the user 302 may query the profiling system 100 with respect to a particular item or individual, or possibly multiple items and/or individuals. The user 302 may access the profiling system 100 via the keyboard 116, or via an external terminal, remote dial-in, over the Internet, or via other means of access.

The profiling system 100 may respond by identifying one or more characteristics of the item or individual, such as the terrorism risk posed by the item (such as a shipping container) or the chances that the user 302 would enjoy dating the individual. The following are examples of properties of items, individuals, or other data, that may be identified by the method aspect of the invention: the (terrorism) risk presented by a shipment; the (terrorism) risk presented by a shipping container; the risk that an individual is a terrorist; the risk of fraud associated with a credit transaction; the risk that cancer (or that another disease) is present; the chances that a person will enjoy dating another person; the chances that a person will enjoy a particular movie; etc. Additional examples include: evaluating (assessing) a restaurant to determine whether or not someone would like to eat there; evaluating property (e.g., a house, a car) to determine whether or not someone would like to buy or sell it; evaluating customer data to determine which customers would be better selections for marketing alternative products; evaluating applications for a job or entrance to a university for suitability; evaluating records of financial filings to determine which records may contain fraud or errors; evaluating candidates for drugs to determine which may be particularly appropriate for addressing a chosen disease; evaluating alternative investments to determine which are appropriate or inappropriate for an investor; evaluating sporting equipment to determine which among a range of possible choices is best for the player; evaluating alternative vacation destinations to determine which the user would be most or least likely to enjoy; evaluating employee performance to determine if a promotion is appropriate; and evaluating data pertinent to the health of equipment and predicting the onset of failures.

Figure 4A:
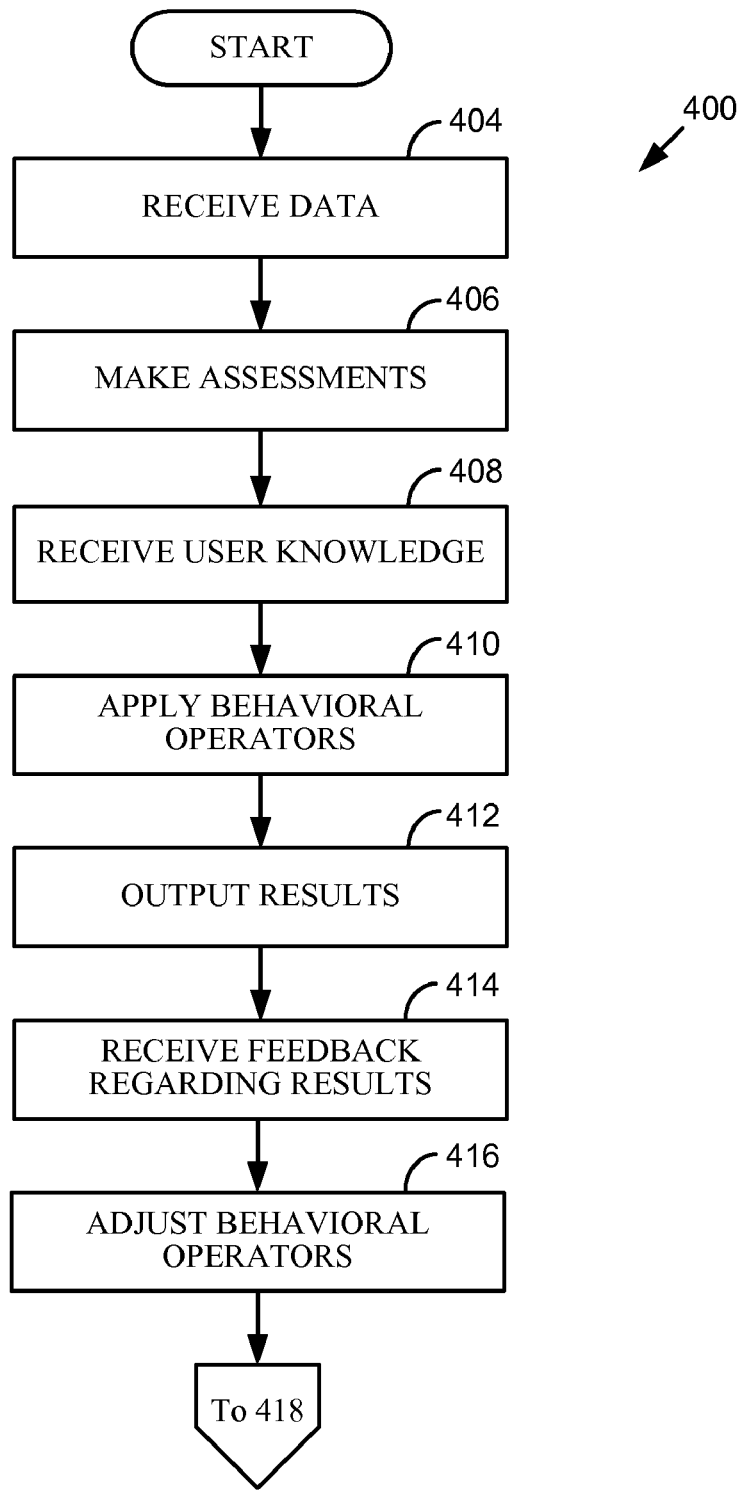
FIGS. 4A-C are a flowchart of an operational sequence for identifying at least one property of data in accordance with an example of the invention.
Figure 4B:
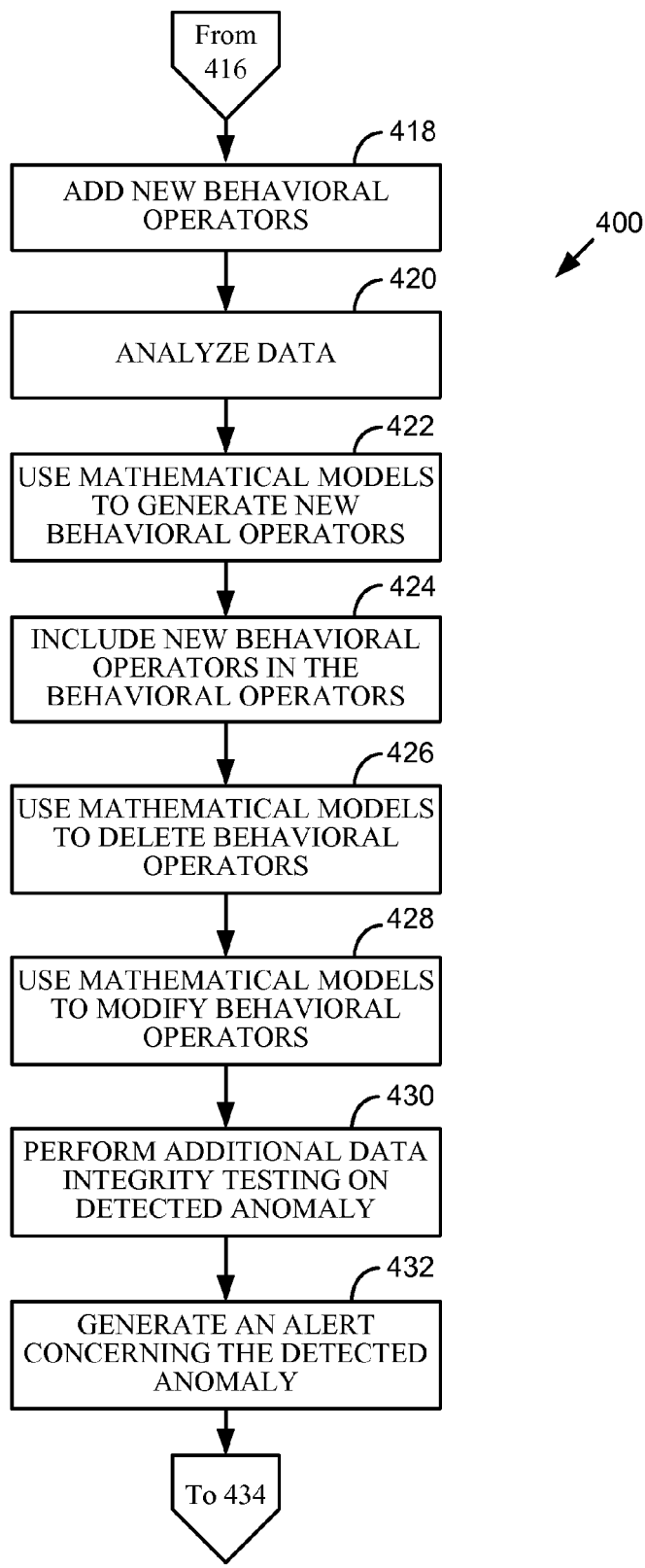
Figure 4C:
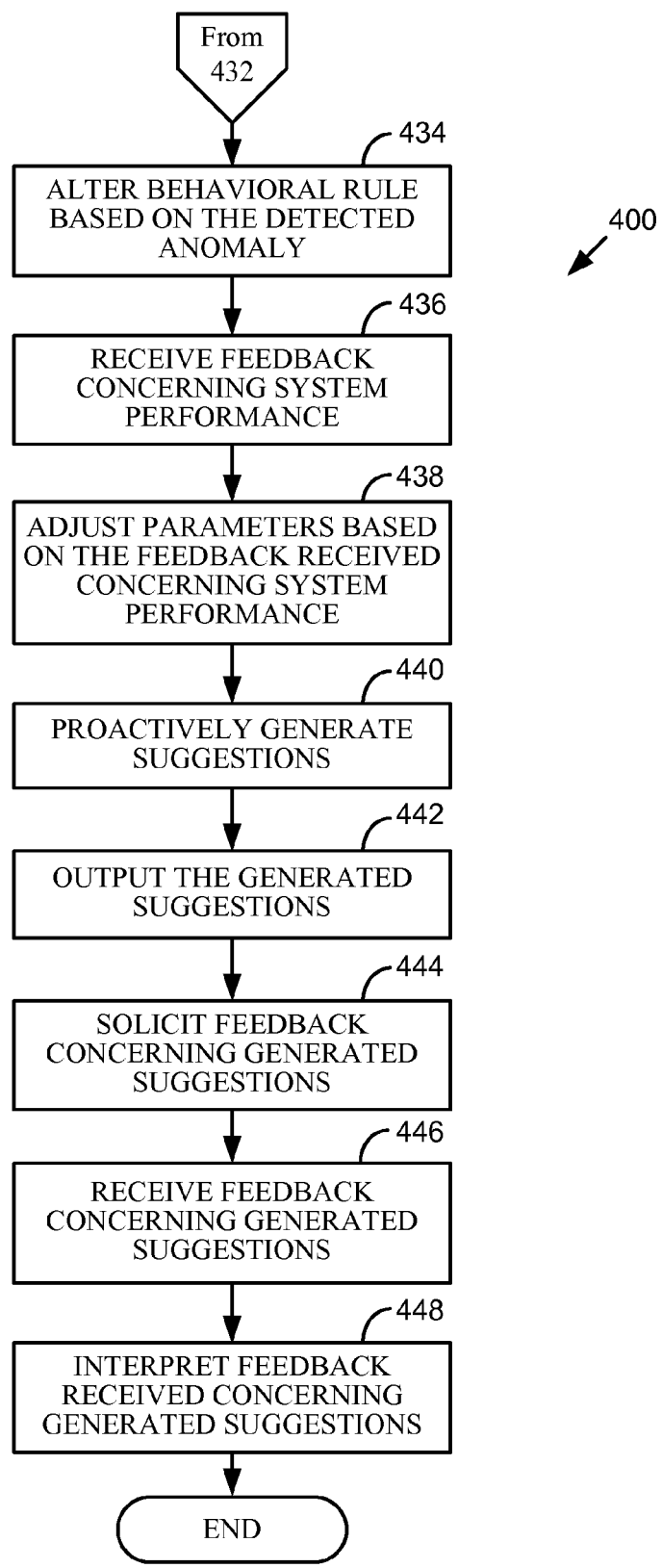

An example of the method aspect of the present invention is illustrated in FIGS. 4A-C, which show a sequence 400 for a method for identifying at least one property of an item(s), individual(s), or other data. For ease of explanation, but without any intended limitation, the example of FIGS. 4A-C is described in the context of the profiling system 100 and the profiling system 300 described above. In one example, the operations of the sequence 400 are performed in the order that they appear in FIGS. 4A-C. However, it will be apparent to persons skilled in the art that the order of performance of the operations of the sequence 400 in many cases may be different than the order in FIGS. 4A-C.

Referring to FIG. 4A, the sequence 400, which may be performed by the profiling system 100, may begin with operation 404, which comprises receiving data, which may also be called gathering the data. The data may be received from the commercial data source 306, the government data source 308, or from other data sources 310. The received data may be, for example, a historical set of credit card transactions, a shipment history of a shipping company, which possibly could be obtained from commercial transaction data, and could also be local, state, federal or foreign government data or data from the United Nations. Data could also be obtained by making direct measurements. The profiling system 100 may input data once, repeatedly, or continuously. To receive the data, the profiling system 100 may access databases such as the commercial data source 306, the government data source 308, and/or other data sources 310, which nominally may contain data regarding the item(s) and/or individual(s). In a shipping container profiling embodiment, the inputted data may include, for example, facts involving prior transactions, transportation of goods, responsible parties, criminal records, known associates, and other data that may be pertinent to evaluating the item(s) and/or individual(s) with respect to the purpose of the user 302. In some examples the profiling system may interrogate the available databases with respect to diverse methods of evaluating the profile desired. The inputted data may be stored in the storage 106. However, the inputted data does not have to be stored in a single storage device or location.

The sequence 400 may also include operation 406, which comprises making assessments regarding features and/or the data. The operation of making assessments regarding features and the data in many instances may include checking the integrity of the data. The data are typically assessed with respect to issues such as:

completeness: (determining if any data are missing, and how many data are missing), reliability (determining if the data were collected at the proper time, and determining if the correct data are being collected);

precision: (determining how precise the data are, and determining if measurements are being made with sufficient resolution—for example, determining if measurements to the nearest meter are being taken when measurements to the nearest centimeter are needed);

accuracy (determining how accurate the data are, and determining if the data are often in error, and determining why the data are in error—for example, determining if there is noise that is inherent to the measurements, and determining if there is noise in the system, or in the sensors, or both, and determining how much human error is involved).

Assessing the data in the shipping container profiling embodiment may include, for example, verifying facts regarding the item(s) and/or individual(s) in question, such as matching a vehicle identification number with a particular make of car, or a passport number with a particular individual. As another example of checking data integrity, in an embodiment for determining which movies a user 302 may like, information regarding how much money a particular movie made could be gathered from at least two sources, and the information could be compared to check for consistency.

Assessing features typically involves discovering features, as well as determining the utility of the features. Discovering features is a process of noting repeated patterns over examples, which could be time-dependent or static. For example, one feature of the moon is that the bright side always points to the sun. The utility of a feature comes in how it is used to accomplish some task. For example, once it is known that the bright side of the moon always faces the sun, a relationship between the moon and the sun can be imputed to try to understand the dynamics of how that feature could arise. Features may be mined from data by looking for patterns that are either repeated simply as patterns themselves, or as patterns associated with events, such as a seasonal variation in sales for clothing.

The interface may allow the user 302 to make adjustments to the profiling system 100 to incorporate the user's 302 knowledge. Thus, the sequence 400 may also include operation 408, which comprises receiving input from the user 302 concerning the user's knowledge. For example, the user 302 may know that a certain credit card has been stolen but this fact has not yet been reported to commercial data warehouses. Based on this knowledge, the user 302 could enter a rule identifying the status of the credit card number with an appropriate level of profiling assessment. (Profiling assessment is different than assessing the data for data integrity.) As another example, the user 302 could have knowledge of the perceived risk associated with various countries or organizations in the world, which could serve to influence the perceived risk associated with shipments of goods from those countries, or goods that have been transported through those countries.

The sequence 400 may also include operation 410, which comprises applying at least one behavioral operator. Behavioral operators may include behavioral rules and/or suitable mathematical constructs (such as a neural network). The behavioral operators represent conditions and/or behavior that are of interest to the user 302, and are usually based on features of the data.

Applying behavioral rules involves developing explicit rules pertaining to features, and to associated patterns of behavior. The behavioral rules are typically conclusions or actions to take (behavior=stimulus–response pair), based on conditions detected. For example, if someone smiles and then shakes your hand, and then smiles, and then shakes your hand, you might develop the rule IF [Person Smiles] THEN [extend hand]. This is a behavior rule, applied to features detected based on sensed data. Another example of a behavioral rule is: If data indicate that a shipping container was sent from a known criminal, then increase the perceived risk associated with the container. The following is another example of a behavioral rule: If data indicate that a potential immigrant has traveled to countries designated to be of concern to the government, then increase the perceived risk associated with the individual. Yet another example of a behavioral rule is: If data indicate that a carrier has a record of significant violations of laws in prior shipments, then increase the perceived risk associated with the carrier and/or item. One example of a behavioral operator, other than a behavioral rule, is a neural network, which in a gaming example, may "profile" a checkerboard based on input features to determine the favorability of the particular position of checkers on the board.

The sequence 400 may also include operation 412, which comprises outputting results, so that the results can be displayed for the user 302 (which can also be called reporting the results). The results are the results of applying at least one behavioral operator to the data. The behavioral rules may also be outputted. The behavioral rules may be reported according to user preferences, for example, with pros and cons sorted separately. The results of the profiling system 100 may be presented to the user 302 with a graphical-user interface. The results presented on the interface may indicate overall profiles, level of risk assessed (possibly with associated color coding representing various conditions), as well as a report on the rationale of the profiling system's evaluation so that the user 302 can understand why the system has reached the decision that it reached and what information might be required to make an improved evaluation. As an example, the operation of reporting results may comprise outputting information which is configured to display a plurality of membership functions, and an indicator showing the relationship between the results and the membership functions, as is shown in FIG. 5.

Figure 5:
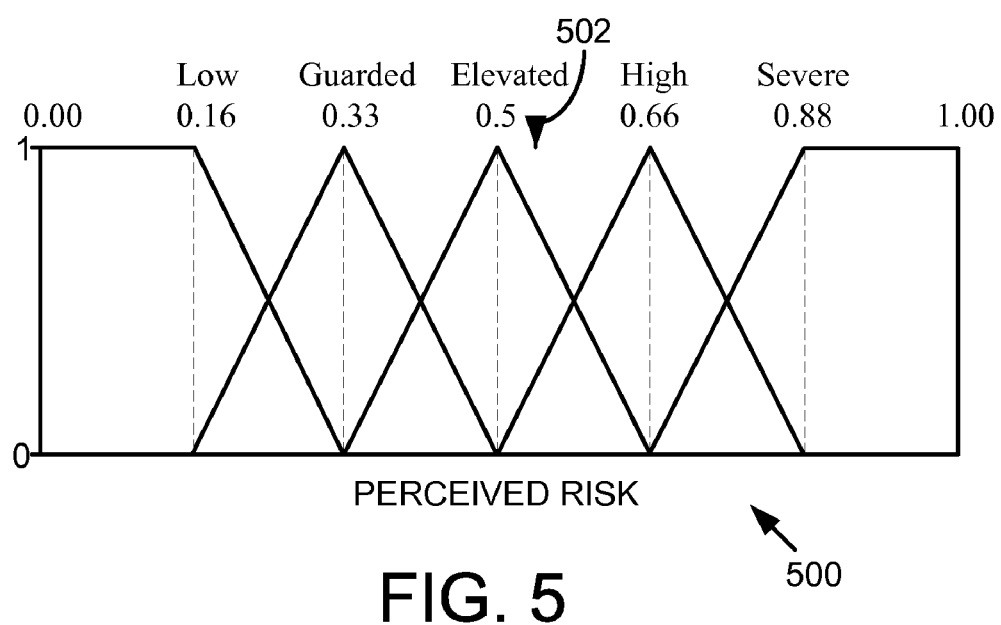
FIG. 5 is a depiction of a display of an output showing a plurality of membership functions and an indicator in accordance with an example of the invention.

FIG. 5 is a depiction of a display 500 of an output showing a plurality of membership functions and an indicator 502. In the display 500 of the output of the profiling system 100, membership functions are displayed as triangles, which, for example, may depict a particular shipment's degree of membership in a linguistic risk categorization. In this embodiment, the display 500 can be called a risk assessment display. The risk designations are compatible with fuzzy logic (which is a form of approximate reasoning).

FIG. 5 shows how five risk levels may be characterized by membership functions. For example, a record that scored as indicated by the small, inverted arrow is a member of both the elevated risk level (indicated by the large upright triangle centered under the number 0.5, and which could be colored yellow) and the overlapping high risk level (indicated by the large, upright triangle centered under the number 0.66, and which could be colored orange). Thus, the score indicated by the small inverted arrow is well into the elevated level, while it also registers toward the low-end of the high level. The display 500 also includes a low risk level (indicated by the horizontal line and the downward sloping line that intersect under the number 0.16, and which could be colored green), and also includes a guarded risk level (indicated by the large upright triangle under the number 0.33, and which could be colored blue), and also includes a severe risk level (indicated by upward sloping line and the horizontal line that intersect under the number 0.87, and which could be colored red).

As an example, linguistic descriptions of risk levels may be defined in terms of their respective lower edges as follows: 0.000 may mark the lower edge of the low risk level; 0.333 may mark the lower edge of the guarded risk level, 0.500 may mark the lower edge of the elevated risk level, 0.667 may mark the lower edge of the high risk level, and 0.875 may mark the lower edge of the severe risk level. In the illustrated example, the center of the severe category is shifted slightly to the right (from 0.833 to 0.875). As shown in FIG. 5, the defining values for the high, elevated, guarded, and low risk levels are centered at the vertexes of their respective triangles (although the membership function for low risk could be a trapezoidal function, symmetric to that of the severe risk category). A linguistic interpretation of the risk, such as low, guarded, elevated, high, or severe, may also be shown in the displayed output.

Linguistic descriptions of risk levels may also be defined in terms of their respective points of intersection between membership functions, indicating equivalent membership in a linguistic description above and below the associated numeric level of assessed risk.

Referring again to FIG. 4A, the sequence 400 may also include operation 414, which comprises receiving feedback from the user 302 regarding the outputted results. As an example, the user 302 may adjust the profiling system's 100 response by modifying the profiling rules in terms of the perceived risk or assessment. For example, a user 302 may choose to err on the side of caution and indicate higher risks in general operations. Another user may be less risk averse and choose to err on the side of indicating a lower risk for certain items and/or individuals who might otherwise have been profiled with some evident concern.

The sequence 400 may also include operation 416, which comprises adjusting at least one of the behavioral operators based on the feedback received regarding the outputted results. The user 302 may also directly adjust rules.

Referring to FIG. 4B, the sequence 400 may also include operation 418, which comprises adding at least one new behavioral operator based on the feedback received regarding the outputted results.

The sequence 400 may also include operation 420, which comprises analyzing the data. The data may be analyzed continuously, or repeatedly, or only initially. The operation of analyzing the data may utilize artificial intelligence methods that incorporate machine-learning techniques to adapt the profiling system's 100 operational rules, inference structure, and/or anomaly detection performance over time. Such methods may include reinforcement learning, where feedback is given when truth is determined regarding specified item(s) and/or individual(s), which permits correcting incorrect profiles and reinforcing correct profiles. These methods may also include evolutionary computing in which alternative hypothesized rules regarding the methods of generating answers to profiling queries can be optimized over time through an iterative process of variation and selection. The profiling system 100 may incorporate other methods, such as neural networks, decision trees, finite state machines, and/or other functions, which serve to enhance the appropriateness, accuracy, and precision of the profiling system 100 in response to user 302 inquiries. The results of checking the integrity of the data, the behavioral operators, and detecting anomalies can be used to improve the machine learning procedures. Furthermore, the results from the machine learning can improve the behavioral operators and anomaly detection performance. In addition to the machine learning techniques, a user 302 may update the data sources, and profiling modules.

The profiling system 100 may use mathematical logic that is capable of handling linguistic concepts. One such logic that can accomplish this is fuzzy logic, which is a form of approximate reasoning. Fuzzy logic accommodates approximate relationships, wherein data can be categorized linguistically (for example as high or low, or heavy or light), rather than numerically. Other methods of approximate reasoning could be incorporated in the profiling system 100. In this manner, the profiling system 100 can handle inquiries even if data are omitted, either in small part, in large part, or completely, and/or if the data are deemed to have less than one-hundred percent reliability.

Two principal approaches to machine learning are called supervised learning and unsupervised learning. Machine learning may also include normal statistical methods. With supervised learning, examples of results (outcomes) are available, and mathematical models are generated to relate data inputs to results. The mathematical models may include behavioral rules, and may also include mathematical constructions other than behavioral rules, such as a neural network, which can be used as a new part of the behavioral rule set. The mathematical models may be used to produce rule-based scoring. As an example, a neural network may assign a value to a particular set of inputs, for example, the arrangement of playing pieces on a checker board. Models may also include human expert rules, such as if A then B, and if C then D. In the case of neural networks, evolutionary computing can be used to assign weights to inputs and nodes in the network, which may also be adjusted by gradient methods, annealing, and other meta-heuristics. The mathematical models can then be used to predict results, if new input data are inputted into the models. As an example, several features regarding a patient and the patient's mammogram may be inputted to a neural network to obtain an output regarding the level of risk that cancer is present. As another example, feature data regarding movies that a person liked and did not like can be used generate a model to predict which movies the person will like and will not like.

The operation 420 of analyzing the data may comprise developing mathematical models to explain outcomes, which is discussed above. The sequence 400 may also include operation 422, which comprises using the mathematical models to generate at least one new behavioral operator (new behavioral rules or new mathematical models). The behavioral operators do not have to be explicit behavioral rules, and for example, could be the output of a neural network (which may provide a correct output using logic that is not explicitly understood). The sequence 400 may also include operation 424, which comprises including the at least one new behavioral operator in the behavioral operators. The sequence 400 may also include operation 426, which comprises using the mathematical models to delete at least one behavioral operator. The sequence 400 may also include operation 428, which comprises using the mathematical models to modify at least one behavioral operator.

The operation 420 of analyzing the data may comprise detecting if there are one or more anomalies in the data, instead of, or in addition to developing mathematical models to explain outcomes. The operation of detecting if there are any anomalies in the data, may also include identifying the anomalies. An anomaly is data that does not fit into any cluster. In specific applications, anomalies may be defined, for example, as machine defects, or as the presence of factors that may indicate terrorist activity. For example, hazardous materials (HAZMAT), may present an anomaly in shipping data that may indicate terrorist activity, and warrant further investigation. In other instances it may not be known what types of anomalies may be present, and an anomaly may be defined as anything unusual in the data.

Unsupervised learning will generally be used for detecting anomalies. Unsupervised learning concerns looking for patterns in data when examples of outcomes are not known. With unsupervised learning, examples of outcomes are not available or are not used, the data may not be labeled, and the computer looks for patterns in the data, and may group the data into clusters. Clusters are formed so as to maximize similarity of data within each cluster, and to maximize differences between different clusters. Anomalies are an indication of unusualness, and may be identified by mining data to find data that does not belong in a cluster. Evolutionary computing, as well as other methods such as k-means and annealing, may be used for forming the clusters. Different models may be generated for the data, for example, linear, or nonlinear models. It is possible to generate multiple reasonable sets of clusters for the same data when conditioning on different aspects of the data's properties. For example, a penny, nickel, dime, and quarter (U.S. coins) could be clustered by assigning the penny and nickel to one cluster and the dime and quarter to another, with the rule being that the clusters separate the data based on unit value. An alternative would be to assign the penny and dime to one cluster and the nickel and quarter to another, thereby partitioning based on the size of the coin. In general, there may be more than two clusters, and determining an optimal number of clusters is a problem of significant mathematical interest with a long history of work. Once the data are clustered, additional analysis can indicate which data least belong to any cluster, and are therefore anomalous.

Mathematical statistical inference, time series analysis methods, pattern recognition, and/or evolutionary computation may be utilized to assess the normalcy of an event or condition. For example, an event or condition may be described in conditional statements, such as, "If there is a pattern of transporting bananas by truck across an international border every Tuesday, and if it is Tuesday, and if the current transported item is not bananas, then increase the perceived risk associated with the transported item." Generally, anomaly detection operates by creating statistical descriptions and/or models of what is routine behavior, and then identifies behaviors that are not routine.

The sequence 400 may also include operation 430, which comprises performing additional data integrity testing on a detected anomaly. The sequence 400 may also include operation 432, which comprises generating an alert concerning the detected anomaly, to notify the user 302 of the anomaly.

Referring to FIG. 4C, the sequence 400 may also include operation 434, which comprises altering at least one behavioral operator based on the detected anomaly.

The degree to which a record is anomalous, or an outlier, can be classified in linguistic categories such as "not anomalous," "low" degree of anomaly, "medium" degree of anomaly, and "high" degree of anomaly. These categories may be defined numerically, arbitrarily, for each cluster. Following the evolution or other determination of clusters, each of the records may have its rule-based risk score incremented according to its rank among the records. The amount a score is incremented may be as follows:

"not anomalous": no incremental change of score;
"low" degree of anomaly: increment score by $1/60$ (0.0167);
"medium" degree of anomaly: increment score by $2/60$ (0.0333); and
"high" degree of anomaly: increment score by $3/60$ (0.05).

The sequence 400 may also include operation 436, which comprises receiving feedback concerning system performance. The sequence 400 may also include operation 438, which comprises adjusting at least one parameter based on the feedback received concerning system performance. For example, in a shipping screening implementation, the user 302 may input feedback information to the profiling system 100 to inform the profiling system 100 that too many alerts are being generated, or conversely, that not enough alerts are being generated. As another example, the profiling system 100 may require more time than is available for a particular application, and consequently, the parameters of the algorithm are adjusted to make the algorithm converge faster. As another example, if an evolutionary algorithm is used for clustering data, based on clustering performance, the user 302 may desire to revise the number of clusters from, for example, two to three or more, or from four to three or less. Other adjustments might be made to the parameters of the clustering algorithm, including the population size, the number of parents, the number of offspring per parent, the types of variation operators, the type of selection operator, and so forth. As another example, in the shipping container screening embodiment, based on evidence obtained by opening a container and examining the contents, the correctness of the possible classification of the contents by the algorithm can be fed back to the method to have the method adjust the parameters of its functions. If the process utilizes a neural network, the error (if any) of the classification could be used as a basis for adjusting the weights (parameters) of the neural network to compensate for the error. As another example, the user's 302 goals could change, and the user 302 could provide feedback to the profiling system 100 so that results will be generated consistent with the new goals.

The sequence 400 may also include operation 440, which comprises proactively generating at least one suggestion. Suggestions may concern properties of available data that are of potential interest to the user. Suggestions may be generated continuously, or repeatedly, or only once. The sequence 400 may also include operation 442, which comprises outputting at least one of the generated suggestions. The sequence 400 may also include operation 444, which comprises soliciting feedback concerning the at least one generated suggestion. The sequence 400 may also include operation 446, which comprises receiving feedback (from the user 302) concerning at least one of the at least one generated suggestions. The sequence 400 may also include operation 448, which comprises interpreting the feedback (or lack of feedback) received concerning at least one of the at least one generated suggestions. The profiling system 100 may analyze the data continuously, or repeatedly, or only once, in order to generate suggestions. As an example, the profiling system 100 may proactively suggest to the user 302 that the user 302 may be interested in dating a person in a dating service data base, who the profiling system 100 has determined may be of interest to the user 302. The profiling system 100 outputs the suggestion so that it can be presented to the user 302 (for example on a display 114), and also asks the user 302 whether the user 302 is interested in the suggested person. The profiling system 100 may adjust its behavior concerning future suggestions, based on the feedback (or lack of feedback) received from the user 302 regarding the person suggested by the profiling system 100. Thus, the profiling system 100 is intelligently interactive, and learns to offer data relevant to the user 302 through the class of machine learning called reinforcement learning.

The sequence 400 need not end after operation 448. Generally, the operations of the sequence 400 may be repeated as many times as desired, and as long as desired. For example, the operation 404 of receiving data may be repeatedly performed. Generally one, several, or all, of the operations may be repeated. Results may be improved with each iteration of the sequence 400.

The decisions, factual instantiations, and other effects of the profiling system 100 may be stored in a data warehouse, for use in subsequent profiling operations, thereby allowing the profiling system 100 to build on its decision making and prior performance. Further, additional databases could be added to the system in a modular fashion for enhanced performance.

In summary, some examples of the invention relate to a method for profiling multiple items and/or individuals, and outputting results, which for example, could indicate a perceived level of risk, in an intuitive user-friendly manner. An exemplary embodiment is a profiling system for categorizing risk, which includes a primary process of rule-based risk scores, and a secondary procedure for anomaly detection using evolutionary computation. The profiling 100 system supplements human expertise with machine learning and data mining tools, such as evolutionary computing. Many of the examples of the invention benefit from the synergy of performing evolutionary computing for performing data modeling and continuous anomaly detection, in combination with proactively generating suggestions and soliciting feedback from a user for adjusting the system.

Some examples of the invention are described in the following entries:

Entry 1. A signal bearing medium tangibly embodying a program of machine-readable instructions executable by a digital processing apparatus to perform a method for identifying at least one property of data, the method comprising the following operations:
  receiving data;
  making assessments regarding the data;
  applying at least one behavioral operator;
  analyzing the data, wherein the operation of analyzing the data comprises detecting if there are any anomalies in the data;
  outputting results;
  receiving feedback concerning system performance; and
  adjusting at least one parameter based on the feedback received concerning system performance, wherein the at least one parameter is a parameter of a machine learning method.

Entry 2. The signal bearing medium of entry 1, wherein the operations further comprise repeating the receiving data, making assessments, applying, analyzing, outputting, receiving feedback, and adjusting operations.

Entry 3. The signal bearing medium of entry 1, wherein the machine learning method involves a neural network, and wherein the at least one parameter is a weight.

Entry 4. The signal bearing medium of entry 1, wherein the machine learning method is an evolutionary algorithm.

Entry 5. The signal bearing medium of entry 1, wherein the machine learning method is an evolutionary clustering algorithm.

Entry 6. The signal bearing medium of entry 1, wherein the machine learning method is reinforcement learning.

Entry 7. The signal bearing medium of entry 1, wherein the machine learning method is hill-climbing.

Entry 8. The signal bearing medium of entry 1, wherein the machine learning method is annealing.

Entry 9. The signal bearing medium of entry 1, wherein the machine learning method is meta-heuristics.

Entry 10. The signal bearing medium of entry 1, wherein the operation of making assessments regarding the data further comprises making assessments regarding features.

Entry 11. The signal bearing medium of entry 1, wherein the operations further comprise receiving user knowledge.

Entry 12. The signal bearing medium of entry 1, wherein the operation of analyzing the data further comprises repeatedly analyzing the data.

Entry 13. The signal bearing medium of entry 1, wherein the operation of analyzing the data further comprises developing at least one mathematical model to explain outcomes.

Entry 14. The signal bearing medium of entry 13, wherein the operations further comprise:
  using the at least one mathematical model to generate at least one new rule; and
  using the at least one new rule as one of the behavioral operators.

Entry 15. The signal bearing medium of entry 13, wherein the operations further comprise using the at least one mathematical model to delete at least one behavioral operator.

Entry 16. The signal bearing medium of entry 13, wherein the operations further comprise using the at least one mathematical model to modify at least one behavioral rule.

Entry 17. The signal bearing medium of entry 1, wherein the operations further comprise performing data integrity testing on a detected anomaly.

Entry 18. The signal bearing medium of entry 1, wherein the operations further comprise generating an alert concerning a detected anomaly.

Entry 19. The signal bearing medium of entry 1, wherein the operations further comprise altering at least one operational rule based on a detected anomaly.

Entry 20. The signal bearing medium of entry 1, wherein the operations further comprise:
  proactively generating at least one suggestion;
  outputting the at least one generated suggestion; and
  soliciting feedback concerning the at least one generated suggestion.

Entry 21. The signal bearing medium of entry 20, wherein the operations further comprise:
  receiving feedback concerning at least one of the at least one generated suggestions; and
  interpreting the feedback received concerning at least one of the at least one generated suggestions.

Entry 22. The signal bearing medium of entry 20:
  wherein the operation of proactively generating at least one suggestion comprises repeatedly generating suggestions; and
  wherein the operation of outputting the at least one suggestion comprises outputting each of the generated suggestions.

Entry 23. The signal bearing medium of entry 1, wherein the operation of receiving data comprises repeatedly receiving data.

Entry 24. The signal bearing medium of entry 1, wherein the data comprises commercial data.

Entry 25. The signal bearing medium of entry 1, wherein the data comprises government data.

Entry 26. The signal bearing medium of entry 1, wherein the operations further comprise:
  receiving feedback regarding the outputted results; and
  adding at least one new operational rule based on the feedback regarding the outputted results.

Entry 27. The signal bearing medium of entry 1, wherein the operations further comprise:
  receiving feedback regarding the outputted results; and
  adjusting at least one operational operator based on the feedback received regarding the outputted results.

Entry 28. The signal bearing medium of entry 1, wherein the operation of outputting results comprises:
  outputting rules and results; and
  outputting information configured to display the rules and results according to user preferences.

Entry 29. The signal bearing medium of entry 1, wherein the operation of outputting results comprises outputting information configured to indicate membership in at least one membership function in a plurality of membership functions.

Entry 30. The signal bearing medium of entry 1, wherein the operation of outputting results comprises outputting information configured to display a plurality of membership functions and an indicator showing a relationship between the results and the membership functions Entry 31. The signal bearing medium of entry 30, wherein each membership function in the plurality of membership functions is associated with a respective level of risk.

Entry 32. The signal bearing medium of entry 1, wherein the at least one property of the data comprises the risk presented by a shipment.

Entry 33. The signal bearing medium of entry 1, wherein the at least one property of the data comprises the risk presented by a shipping container.

Entry 34. The signal bearing medium of entry 1, wherein the at least one property of the data comprises the risk that an individual is a terrorist.

Entry 35. The signal bearing medium of entry 1, wherein the at least one property of the data comprises the risk associated with a credit transaction.

Entry 36. The signal bearing medium of entry 1, wherein the at least one property of the data comprises the risk that cancer is present.

Entry 37. The signal bearing medium of entry 1, wherein the at least one property of the data comprises the chances that a person will enjoy dating another person.

Entry 38. The signal bearing medium of entry 1, wherein the at least one property of the data comprises the chances that a person will enjoy a particular movie.

Entry 39. A signal bearing medium tangibly embodying a program of machine-readable instructions executable by a digital processing apparatus to perform a method for identifying at least one property of data, the method comprising the following operations:
  receiving data;
  making assessments regarding the data;
  applying at least one behavioral operator;
  outputting results;

receiving feedback regarding the outputted results;
adjusting at least one behavioral operator based on the feedback received regarding the outputted results; and
analyzing the data, wherein the operation of analyzing the data comprises generating at least one machine generated mathematical model to explain outcomes.

Entry 40. The signal bearing medium of entry 39, wherein the operations further comprise:
proactively generating at least one suggestion;
outputting the at least one generated suggestion; and
soliciting feedback concerning the at least one generated suggestion.

Entry 41. The signal bearing medium of entry 40, wherein the operations further comprise:
receiving feedback concerning at least one of the at least one generated suggestions; and
interpreting the feedback received concerning at least one of the at least one generated suggestions.

Entry 42. The signal bearing medium of entry 40, wherein the operations further comprise:
receiving feedback concerning system performance; and
adjusting at least one parameter based on the feedback received concerning system performance, wherein the at least one parameter is a parameter of a machine learning method.

Entry 43. The signal bearing medium of entry 39, wherein the operation of analyzing the data comprises detecting if there are any anomalies in the data.

Entry 44. A signal bearing medium tangibly embodying a program of machine-readable instructions executable by a digital processing apparatus to perform a method for identifying at least one property of data, the method comprising the following operations:
receiving data;
making assessments regarding the data;
checking integrity of the data;
applying at least one behavioral operator;
using machine learning to detect if there are any anomalies in the data;
outputting results;
proactively generating at least one suggestion;
outputting the at least one generated suggestion; and
soliciting feedback concerning the at least one generated suggestion.

Entry 45. The signal bearing medium of entry 44, wherein the operations further comprise repeating the receiving data, making assessments, applying, outputting, receiving feedback, and adjusting operations.

Entry 46. The signal bearing medium of entry 44, wherein the operations further comprise:
receiving feedback concerning at least one of the at least one generated suggestions; and
interpreting the feedback received concerning at least one of the at least one generated suggestions.

Entry 47. The signal bearing medium of entry 44, wherein the operations further comprise:
receiving feedback concerning system performance; and
adjusting at least one parameter based on the feedback received concerning system performance, wherein the at least one parameter is a parameter of a machine learning method.

Entry 48. The signal bearing medium of entry 44, wherein the operation of using machine learning to detect if there are any anomalies in the data comprises using evolutionary learning.

Entry 49. The signal bearing medium of entry 44, wherein the operations further comprise analyzing the data, and wherein the operation of analyzing the data comprises generating at least one machine generated mathematical model to explain outcomes.

Entry 50. A signal bearing medium tangibly embodying a program of machine-readable instructions executable by a digital processing apparatus to perform a method for identifying at least one property of data, the method comprising the following operations:
receiving data;
making assessments regarding features and the data;
receiving user knowledge;
applying at least one behavioral operator;
outputting results;
wherein the operation of outputting results comprises outputting information configured to display a plurality of membership functions and an indicator showing a relationship between the results and the membership functions;
receiving feedback regarding the outputted results;
adjusting at least one of the at least one behavioral operators based on the feedback received regarding the outputted results;
adding at least one new behavioral operator based on the feedback received regarding the outputted results;
analyzing the data;
wherein the operation of analyzing the data comprises developing at least one mathematical model to explain outcomes;
using the at least one mathematical model to generate at least one new behavioral operator;
including the at least one new behavioral operator in the behavioral operators;
using the at least one mathematical model to delete at least one behavioral operator;
using the at least one mathematical model to modify at least one behavioral operator;
wherein the operation of analyzing the data further comprises detecting if there are any anomalies in the data;
performing additional data integrity testing on a detected anomaly;
generating an alert concerning the detected anomaly;
altering at least one behavioral operator based on the detected anomaly;
receiving feedback concerning system performance;
adjusting at least one parameter based on the feedback received concerning system performance, wherein the at least one parameter is a parameter of a machine learning method;
proactively generating at least one suggestion;
outputting the at least one generated suggestion;
soliciting feedback concerning the at least one generated suggestion;
receiving feedback concerning at least one of the at least one generated suggestions; and
interpreting the feedback received concerning at least one of the at least one generated suggestions.

Entry 51. A signal bearing medium tangibly embodying machine-readable code executable by a digital processing apparatus for identifying at least one property of data, the code comprising:
a data integrity module configured to examine integrity of the data;
a behavioral operator module configured generate and evaluate behavioral operators;
an anomaly detection module configured to detect anomalies in the data;
a machine learning module configured to analyze the data; and
an interface/controller module coupled to the data integrity module, the behavioral operators module, the anomaly detection module, and the machine learning module; wherein the interface/controller module is configured to receive the data.

Entry 52. The signal bearing medium of entry 51, wherein the interface/controller module is further configured to:
   proactively generate suggestions;
   output the generated suggestions; and
   solicit feedback concerning the generated suggestions.

Entry 53. The signal bearing medium of entry 52, wherein the interface/controller module is further configured to interpret feedback concerning the generated suggestions.

Entry 54. The signal bearing medium of entry 51, wherein the interface/controller module is further configured to:
   receive feedback concerning system performance; and
   adjust parameters based on the feedback received concerning system performance.

Entry 55. The signal bearing medium of entry 51:
   wherein the interface/controller module is further configured to output results and to receive feedback regarding the outputted results; and
   wherein the behavioral operators module is further configured to adjust the behavioral operators based on the feedback received regarding the outputted results.

Entry 56. The signal bearing medium of entry 51:
   wherein the interface/controller module is further configured output results and to receive feedback regarding outputted results; and
   wherein the behavioral operators module is further configured to add new behavioral operators based on the feedback received regarding the outputted results.

Entry 57. A computer data signal embodied in a carrier wave embodying a program of machine-readable instructions executable by a digital processing apparatus to perform a method for identifying at least one property of data, wherein the method comprises the following operations:
   receiving data;
   making assessments regarding the data;
   applying at least one behavioral operator;
   detecting if there are any anomalies in the data;
   outputting results;
   receiving feedback concerning system performance; and
   adjusting at least one parameter based on the feedback received concerning system performance, wherein the at least one parameter is a parameter of a machine learning method.

Entry 58. A profiling system, comprising:
   a storage; and
   a processor coupled to the storage, wherein the processor is programmed to perform the following operations: receiving data;
   making assessments regarding the data;
   applying at least one behavioral operator;
   outputting results;
   receiving feedback regarding the outputted results;
   adjusting at least one behavioral operator based on the feedback received regarding the outputted results; and
   analyzing the data, wherein the operation of analyzing the data comprises generating at least one machine generated mathematical model to explain outcomes.

Entry 59. The profiling system of entry 58, wherein the operations further comprise:
   proactively generating at least one suggestion;
   outputting the at least one generated suggestion; and
   soliciting feedback concerning the at least one generated suggestion.

Entry 60. A profiling system, comprising:
   means for receiving data;
   means for making assessments regarding the data;
   means for applying at least one behavioral operator;
   means for outputting results;
   means for receiving feedback concerning system performance;
   means for adjusting at least one parameter based on the feedback received concerning system performance, wherein the at least one parameter is a parameter of a machine learning method;
   means for analyzing the data;
   means for proactively generating at least one suggestion;
   means for outputting the at least one generated suggestion; and
   means for soliciting feedback concerning the at least one generated suggestion.

Entry 61. A method for identifying at least one property of data, the method comprising the following operations:
   receiving data;
   making assessments regarding the data;
   applying at least one behavioral operator;
   analyzing the data, wherein the operation of analyzing the data comprises detecting if there are any anomalies in the data;
   outputting results;
   receiving feedback concerning system performance; and
   adjusting at least one parameter based on the feedback received concerning system performance, wherein the at least one parameter is a parameter of a machine learning method.

Entry 62. A method for identifying at least one property of data, the method comprising the following operations:
   receiving data;
   making assessments regarding the data;
   applying at least one behavioral operator;
   outputting results;
   receiving feedback regarding the outputted results;
   adjusting at least one behavioral operator based on the feedback received regarding the outputted results; and
   analyzing the data, wherein the operation of analyzing the data comprises generating at least one machine generated mathematical model to explain outcomes.

Entry 63. A method for identifying at least one property of data, the method comprising the following operations:
   receiving data;
   making assessments regarding the data;
   checking integrity of the data;
   applying at least one behavioral operator;
   generating at least one machine generated mathematical model to explain outcomes;
   outputting results;
   proactively generating at least one suggestion;
   outputting the at least one generated suggestion; and
   soliciting feedback concerning the at least one generated suggestion.

III. Other Embodiments

The preceding disclosure describes a number of illustrative embodiments of the invention. It will be apparent to persons skilled in the art that various changes and modifications can be made to the described embodiments without departing from the scope of the invention as defined by the following claims. Also, although elements of the invention may be described or claimed herein in the singular, the plural is contemplated unless limitation to the singular is explicitly stated.

What is claimed is:

1. A computer readable storage medium tangibly embodying a program of machine-readable instructions executable by a digital processing apparatus to perform a method for identifying at least one property of data, the method comprising the following operations:
- receiving data;
- making assessments regarding the data;
- applying at least one behavioral operator;
- analyzing the data, wherein the operation of analyzing the data comprises detecting if there are any anomalies in the data;
- outputting results;
- receiving feedback concerning system performance; and
- adjusting at least one parameter based on the feedback received concerning system performance, wherein the at least one parameter is a parameter of a machine learning method.

2. A computer readable storage medium tangibly embodying a program of machine-readable instructions executable by a digital processing apparatus to perform a method for evaluating employee performance, the method comprising the following operations:
- receiving data regarding an employee;
- making assessments regarding the data, wherein the operation of making assessments regarding the data further comprises making assessments regarding features;
- applying at least one behavioral operator;
- analyzing the data, wherein the operation of analyzing the data comprises detecting if there are any anomalies in the data;
- outputting results;
- receiving feedback concerning system performance; and
- adjusting at least one parameter based on the feedback received concerning system performance, wherein the at least one parameter is a parameter of a machine learning method.

3. The computer readable storage medium of claim 2, wherein the operations further comprise repeating the receiving data, making assessments, applying, analyzing, outputting, receiving feedback, and adjusting operations.

4. The computer readable storage medium of claim 2, wherein the machine learning method is an evolutionary algorithm.

5. The computer readable storage medium of claim 2, wherein the machine learning method is an evolutionary clustering algorithm.

6. The computer readable storage medium of claim 2, wherein the machine learning method is reinforcement learning.

7. The computer readable storage medium of claim 2, wherein the machine learning method is hill-climbing.

8. The computer readable storage medium of claim 2, wherein the machine learning method is annealing.

9. The computer readable storage medium of claim 2, wherein the machine learning method is meta-heuristics.

10. The computer readable storage medium of claim 2, wherein the operations further comprise receiving user knowledge.

11. The computer readable storage medium of claim 2, wherein the operation of analyzing the data further comprises repeatedly analyzing the data.

12. The computer readable storage medium of claim 2, wherein the operations further comprise performing data integrity testing on a detected anomaly.

13. The computer readable storage medium of claim 2, wherein the operations further comprise generating an alert concerning a detected anomaly.

14. The computer readable storage medium of claim 2, wherein the operations further comprise altering at least one operational rule based on a detected anomaly.

15. The computer readable storage medium of claim 2, wherein the operations further comprise:
- proactively generating at least one suggestion;
- outputting the at least one generated suggestion; and
- soliciting feedback concerning the at least one generated suggestion.

16. The computer readable storage medium of claim 15, wherein the operations further comprise:
- receiving feedback concerning at least one of the at least one generated suggestions; and
- interpreting the feedback received concerning at least one of the at least one generated suggestions.

17. The computer readable storage medium of claim 15:
- wherein the operation of proactively generating at least one suggestion comprises repeatedly generating suggestions; and
- wherein the operation of outputting the at least one suggestion comprises outputting each of the generated suggestions.

18. The computer readable storage medium of claim 2, wherein the operation of receiving data comprises repeatedly receiving data.

19. The computer readable storage medium of claim 2, wherein the data comprises commercial data.

20. The computer readable storage medium of claim 2, wherein the data comprises government data.

21. The computer readable storage medium of claim 2, wherein the operation of outputting results comprises:
- outputting rules and results; and
- outputting information configured to display the rules and results according to user preferences.

22. The computer readable storage medium of claim 2, wherein the operation of outputting results comprises outputting information configured to indicate membership in at least one membership function in a plurality of membership functions.

23. The computer readable storage medium of claim 2, wherein the operation of outputting results comprises outputting information configured to display a plurality of membership functions and an indicator showing a relationship between the results and the membership functions.

24. A computer readable storage medium tangibly embodying a program of machine-readable instructions executable by a digital processing apparatus to perform a method for evaluating employee performance, the method comprising the following operations:
- receiving data regarding an employee;
- making assessments regarding the data;
- applying at least one behavioral operator;
- analyzing the data, wherein the operation of analyzing the data comprises detecting if there are any anomalies in the data;
- outputting results;
- receiving feedback concerning system performance;
- adjusting at least one parameter based on the feedback received concerning system performance, wherein the at least one parameter is a parameter of a machine learning method;
- wherein the machine learning method involves a neural network, and wherein the at least one parameter is a weight.

25. A computer readable storage medium tangibly embodying a program of machine-readable instructions executable by a digital processing apparatus to perform a method for evaluating employee performance, the method comprising the following operations:
- receiving data regarding an employee;
- making assessments regarding the data;
- applying at least one behavioral operator;
- analyzing the data, wherein the operation of analyzing the data comprises detecting if there are any anomalies in the data;
- outputting results;
- receiving feedback concerning system performance;
- adjusting at least one parameter based on the feedback received concerning system performance, wherein the at least one parameter is a parameter of a machine learning method;
- wherein the operation of analyzing the data further comprises developing at least one mathematical model to explain outcomes.

26. The computer readable storage medium of claim 25, wherein the operations further comprise using the at least one mathematical model to delete at least one behavioral operator.

27. The computer readable storage medium of claim 25, wherein the operations further comprise using the at least one mathematical model to modify at least one behavioral rule.

28. A computer readable storage medium tangibly embodying a program of machine-readable instructions executable by a digital processing apparatus to perform a method for evaluating employee performance, the method comprising the following operations:
- receiving data regarding an employee;
- making assessments regarding the data;
- applying at least one behavioral operator;
- analyzing the data, wherein the operation of analyzing the data comprises detecting if there are any anomalies in the data;
- outputting results;
- receiving feedback concerning system performance;
- adjusting at least one parameter based on the feedback received concerning system performance, wherein the at least one parameter is a parameter of a machine learning method;
- wherein the operation of analyzing the data further comprises developing at least one mathematical model to explain outcomes;
- using the at least one mathematical model to generate at least one new rule; and
- using the at least one new rule as one of the behavioral operators.

29. A computer readable storage medium tangibly embodying a program of machine-readable instructions executable by a digital processing apparatus to perform a method for evaluating employee performance, the method comprising the following operations:
- receiving data regarding an employee;
- making assessments regarding the data;
- applying at least one behavioral operator;
- analyzing the data, wherein the operation of analyzing the data comprises detecting if there are any anomalies in the data;
- outputting results;
- receiving feedback concerning system performance;
- adjusting at least one parameter based on the feedback received concerning system performance, wherein the at least one parameter is a parameter of a machine learning method;
- receiving feedback regarding the outputted results; and
- adding at least one new operational rule based on the feedback regarding the outputted results.

30. A computer readable storage medium tangibly embodying a program of machine-readable instructions executable by a digital processing apparatus to perform a method for evaluating employee performance, the method comprising the following operations:
- receiving data regarding an employee;
- making assessments regarding the data;
- applying at least one behavioral operator;
- analyzing the data, wherein the operation of analyzing the data comprises detecting if there are any anomalies in the data;
- outputting results;
- receiving feedback concerning system performance;
- adjusting at least one parameter based on the feedback received concerning system performance, wherein the at least one parameter is a parameter of a machine learning method;
- receiving feedback regarding the outputted results; and
- adjusting at least one operational operator based on the feedback received regarding the outputted results.

31. A computer readable storage medium tangibly embodying a program of machine-readable instructions executable by a digital processing apparatus to perform a method for evaluating employee performance, the method comprising the following operations:
- receiving data regarding an employee;
- making assessments regarding the data;
- applying at least one behavioral operator;
- outputting results;
- receiving feedback regarding the outputted results;
- adjusting at least one behavioral operator based on the feedback received regarding the outputted results; and
- analyzing the data, wherein the operation of analyzing the data comprises generating at least one machine generated mathematical model to explain outcomes, and comprises detecting if there are any anomalies in the data.

32. The computer readable storage medium of claim 31, wherein the operations further comprise:
- proactively generating at least one suggestion;
- outputting the at least one generated suggestion; and
- soliciting feedback concerning the at least one generated suggestion.

33. The computer readable storage medium of claim 32, wherein the operations further comprise:
- receiving feedback concerning at least one of the at least one generated suggestions; and
- interpreting the feedback received concerning at least one of the at least one generated suggestions.

34. The computer readable storage medium of claim 32, wherein the operations further comprise:
- receiving feedback concerning system performance; and
- adjusting at least one parameter based on the feedback received concerning system performance, wherein the at least one parameter is a parameter of a machine learning method.

35. A computer readable storage medium tangibly embodying a program of machine-readable instructions executable by a digital processing apparatus to perform a method for evaluating employee performance, the method comprising the following operations:
- receiving data regarding an employee;
- making assessments regarding the data;
- checking integrity of the data;
- applying at least one behavioral operator;
- using machine learning to detect if there are any anomalies in the data;
- outputting results;

proactively generating at least one suggestion;
outputting the at least one generated suggestion;
soliciting feedback concerning the at least one generated suggestion;
receiving feedback concerning at least one of the at least one generated suggestions; and
interpreting the feedback received concerning at least one of the at least one generated suggestions.

36. The computer readable storage medium of claim 35, wherein the operations further comprise repeating the receiving data, making assessments, applying, outputting, receiving feedback, and adjusting operations.

37. The computer readable storage medium of claim 35, wherein the operations further comprise:
receiving feedback concerning system performance; and
adjusting at least one parameter based on the feedback received concerning system performance, wherein the at least one parameter is a parameter of a machine learning method.

38. The computer readable storage medium of claim 35, wherein the operation of using machine learning to detect if there are any anomalies in the data comprises using evolutionary learning.

39. The computer readable storage medium of claim 35, wherein the operations further comprise analyzing the data, and wherein the operation of analyzing the data comprises generating at least one machine generated mathematical model to explain outcomes.

40. A computer readable storage medium tangibly embodying a program of machine-readable instructions executable by a digital processing apparatus to perform a method for evaluating employee performance, the method comprising the following operations:
receiving data regarding an employee;
making assessments regarding features and the data;
receiving user knowledge;
applying at least one behavioral operator;
outputting results;
wherein the operation of outputting results comprises outputting information configured to display a plurality of membership functions and an indicator showing a relationship between the results and the membership functions;
receiving feedback regarding the outputted results;
adjusting at least one of the at least one behavioral operators based on the feedback received regarding the outputted results;
adding at least one new behavioral operator based on the feedback received regarding the outputted results;
analyzing the data;
wherein the operation of analyzing the data comprises utilizing a digital processing apparatus to develop at least one mathematical model to explain outcomes;
using the at least one mathematical model to generate at least one new behavioral operator;
including the at least one new behavioral operator in the behavioral operators;
using the at least one mathematical model to delete at least one behavioral operator;
using the at least one mathematical model to modify at least one behavioral operator;
wherein the operation of analyzing the data further comprises detecting if there are any anomalies in the data;
utilizing the digital processing apparatus to perform additional data integrity testing on a detected anomaly;
generating an alert concerning the detected anomaly;
altering at least one behavioral operator based on the detected anomaly;
receiving feedback concerning system performance;
adjusting at least one parameter based on the feedback received concerning system performance, wherein the at least one parameter is a parameter of a machine learning method;
proactively generating at least one suggestion;
outputting the at least one generated suggestion;
soliciting feedback concerning the at least one generated suggestion;
receiving at the digital processing apparatus, feedback concerning at least one of the at least one generated suggestions; and
interpreting the feedback received concerning at least one of the at least one generated suggestions.

41. A computer readable storage medium tangibly embodying machine-readable code executable by a digital processing apparatus for evaluating employee performance, the code comprising:
a data integrity module configured to examine integrity of the data, wherein the data regards an employee;
a behavioral operator module configured to generate and evaluate behavioral operators;
an anomaly detection module configured to detect anomalies in the data;
a machine learning module configured to analyze the data; and
an interface/controller module coupled to the data integrity module, the behavioral operators module, the anomaly detection module, and the machine learning module; wherein the interface/controller module is configured to receive the data.

42. The computer readable storage medium of claim 41, wherein the interface/controller module is further configured to:
proactively generate suggestions;
output the generated suggestions; and
solicit feedback concerning the generated suggestions.

43. The computer readable storage medium of claim 42, wherein the interface/controller module is further configured to interpret feedback concerning the generated suggestions.

44. The computer readable storage medium of claim 41, wherein the interface/controller module is further configured to:
receive feedback concerning system performance; and
adjust parameters based on the feedback received concerning system performance.

45. The computer readable storage medium of claim 41:
wherein the interface/controller module is further configured to output results and to receive feedback regarding the outputted results; and
wherein the behavioral operators module is further configured to adjust the behavioral operators based on the feedback received regarding the outputted results.

46. The computer readable storage medium of claim 41:
wherein the interface/controller module is further configured to output results and to receive feedback regarding outputted results; and
wherein the behavioral operators module is further configured to add new behavioral operators based on the feedback received regarding the outputted results.

47. A profiling system, comprising:
a storage; and
a processor coupled to the storage, wherein the processor is programmed to perform the following operations for evaluating the performance of an employee:

receiving data regarding the employee;
making assessments regarding the data;
applying at least one behavioral operator;
outputting results;
receiving feedback regarding the outputted results;
adjusting at least one behavioral operator based on the feedback received regarding the outputted results;
analyzing the data, wherein the operation of analyzing the data comprises generating at least one machine generated mathematical model to explain outcomes;
proactively generating at least one suggestion;
outputting the at least one generated suggestion; and
soliciting feedback concerning the at least one generated suggestion.

48. A method for evaluating employee performance, the method comprising the following operations:
receiving data regarding an employee;
making assessments regarding the data, wherein the operation of making assessments regarding the data further comprises making assessments regarding features;
applying at least one behavioral operator;
utilizing a digital processing apparatus to analyze the data, wherein the operation of analyzing the data comprises detecting if there are any anomalies in the data;
outputting results;
receiving at the digital processing apparatus, feedback concerning system performance; and
adjusting at least one parameter based on the feedback received concerning system performance, wherein the at least one parameter is a parameter of a machine learning method.

49. A method for evaluating employee performance, the method comprising the following operations:
receiving data regarding an employee;
making assessments regarding the data;
applying at least one behavioral operator;
analyzing the data, wherein the operation of analyzing the data comprises detecting if there are any anomalies in the data;
outputting results;
receiving, at a digital processing apparatus, feedback concerning system performance;
adjusting at least one parameter based on the feedback received concerning system performance, wherein the at least one parameter is a parameter of a machine learning method;
wherein the operation of analyzing the data further comprises developing at least one mathematical model to explain outcomes;
using the at least one mathematical model to generate at least one new rule; and
using the at least one new rule as one of the behavioral operators.

50. A computer readable storage medium tangibly embodying a program of machine-readable instructions executable by a digital processing apparatus to perform a method for identifying the risk presented by a shipment, the method comprising the following operations:
receiving data regarding the shipment;
making assessments regarding the data, wherein the operation of making assessments regarding the data further comprises making assessments regarding features;
applying at least one behavioral operator;
analyzing the data, wherein the operation of analyzing the data comprises detecting if there are any anomalies in the data;
outputting results;
receiving feedback concerning system performance; and
adjusting at least one parameter based on the feedback received concerning system performance, wherein the at least one parameter is a parameter of a machine learning method.

51. A computer readable storage medium tangibly embodying a program of machine-readable instructions executable by a digital processing apparatus to perform a method for identifying the terrorism risk posed by an item, the method comprising the following operations:
receiving data regarding the item;
making assessments regarding the data, wherein the operation of making assessments regarding the data further comprises making assessments regarding features;
applying at least one behavioral operator;
analyzing the data, wherein the operation of analyzing the data comprises detecting if there are any anomalies in the data;
outputting results;
receiving feedback concerning system performance; and
adjusting at least one parameter based on the feedback received concerning system performance, wherein the at least one parameter is a parameter of a machine learning method.

52. A computer readable storage medium tangibly embodying a program of machine-readable instructions executable by a digital processing apparatus to perform a method for identifying the risk an individual is a terrorist, the method comprising the following operations:
receiving data regarding the individual;
making assessments regarding the data, wherein the operation of making assessments regarding the data further comprises making assessments regarding features;
applying at least one behavioral operator;
analyzing the data, wherein the operation of analyzing the data comprises detecting if there are any anomalies in the data;
outputting results;
receiving feedback concerning system performance; and
adjusting at least one parameter based on the feedback received concerning system performance, wherein the at least one parameter is a parameter of a machine learning method.

53. A computer readable storage medium tangibly embodying a program of machine-readable instructions executable by a digital processing apparatus to perform a method for evaluating the risk that a disease is present, the method comprising the following operations:
receiving data regarding a patient;
making assessments regarding the data, wherein the operation of making assessments regarding the data further comprises making assessments regarding features;
applying at least one behavioral operator;
analyzing the data, wherein the operation of analyzing the data comprises detecting if there are any anomalies in the data;
outputting results;
receiving feedback concerning system performance; and
adjusting at least one parameter based on the feedback received concerning system performance, wherein the at least one parameter is a parameter of a machine learning method.

54. The computer readable storage medium of claim 53, wherein the disease is cancer.

55. A computer readable storage medium tangibly embodying a program of machine-readable instructions executable by a digital processing apparatus to perform a method for evaluating the risk that a disease is present, the method comprising the following operations:
- receiving data regarding a patient;
- making assessments regarding the data;
- applying at least one behavioral operator;
- analyzing the data, wherein the operation of analyzing the data comprises detecting if there are any anomalies in the data;
- outputting results;
- receiving feedback concerning system performance;
- adjusting at least one parameter based on the feedback received concerning system performance, wherein the at least one parameter is a parameter of a machine learning method;
- wherein the operation of analyzing the data further comprises developing at least one mathematical model to explain outcomes;
- using the at least one mathematical model to generate at least one new rule; and
- using the at least one new rule as one of the behavioral operators.

56. A computer readable storage medium tangibly embodying a program of machine-readable instructions executable by a digital processing apparatus to perform a method for evaluating the chances a person will enjoy dating another person, the method comprising the following operations:
- receiving data regarding the other person;
- making assessments regarding the data, wherein the operation of making assessments regarding the data further comprises making assessments regarding features;
- applying at least one behavioral operator;
- analyzing the data, wherein the operation of analyzing the data comprises detecting if there are any anomalies in the data;
- outputting results;
- receiving feedback concerning system performance; and
- adjusting at least one parameter based on the feedback received concerning system performance, wherein the at least one parameter is a parameter of a machine learning method.

57. A computer readable storage medium tangibly embodying a program of machine-readable instructions executable by a digital processing apparatus to perform a method for evaluating the risk of fraud presented by a credit transaction, the method comprising the following operations:
- receiving data regarding the credit transaction;
- making assessments regarding the data, wherein the operation of making assessments regarding the data further comprises making assessments regarding features;
- applying at least one behavioral operator;
- analyzing the data, wherein the operation of analyzing the data comprises detecting if there are any anomalies in the data;
- outputting results;
- receiving feedback concerning system performance; and
- adjusting at least one parameter based on the feedback received concerning system performance, wherein the at least one parameter is a parameter of a machine learning method.

58. A computer readable storage medium tangibly embodying a program of machine-readable instructions executable by a digital processing apparatus to perform a method for evaluating the risk of fraud in a financial filing, the method comprising the following operations:
- receiving data regarding the financial filing;
- making assessments regarding the data, wherein the operation of making assessments regarding the data further comprises making assessments regarding features;
- applying at least one behavioral operator;
- analyzing the data, wherein the operation of analyzing the data comprises detecting if there are any anomalies in the data;
- outputting results;
- receiving feedback concerning system performance; and
- adjusting at least one parameter based on the feedback received concerning system performance, wherein the at least one parameter is a parameter of a machine learning method.

59. A computer readable storage medium tangibly embodying a program of machine-readable instructions executable by a digital processing apparatus to perform a method for evaluating the chances a person will enjoy a particular movie, the method comprising the following operations:
- receiving data regarding the movie;
- making assessments regarding the data, wherein the operation of making assessments regarding the data further comprises making assessments regarding features;
- applying at least one behavioral operator;
- analyzing the data, wherein the operation of analyzing the data comprises detecting if there are any anomalies in the data;
- outputting results;
- receiving feedback concerning system performance; and
- adjusting at least one parameter based on the feedback received concerning system performance, wherein the at least one parameter is a parameter of a machine learning method.

60. A computer readable storage medium tangibly embodying a program of machine-readable instructions executable by a digital processing apparatus to perform a method for evaluating the chances a person will want to eat at a particular restaurant, the method comprising the following operations:
- receiving data regarding the restaurant;
- making assessments regarding the data, wherein the operation of making assessments regarding the data further comprises making assessments regarding features;
- applying at least one behavioral operator;
- analyzing the data, wherein the operation of analyzing the data comprises detecting if there are any anomalies in the data;
- outputting results;
- receiving feedback concerning system performance; and
- adjusting at least one parameter based on the feedback received concerning system performance, wherein the at least one parameter is a parameter of a machine learning method.

61. A computer readable storage medium tangibly embodying a program of machine-readable instructions executable by a digital processing apparatus to perform a method for evaluating the chances a person will enjoy a particular vacation destination, the method comprising the following operations:
- receiving data regarding the particular vacation destination;
- making assessments regarding the data, wherein the operation of making assessments regarding the data further comprises making assessments regarding features;
- applying at least one behavioral operator;

analyzing the data, wherein the operation of analyzing the data comprises detecting if there are any anomalies in the data;

outputting results;

receiving feedback concerning system performance; and adjusting at least one parameter based on the feedback received concerning system performance, wherein the at least one parameter is a parameter of a machine learning method.

62. A computer readable storage medium tangibly embodying a program of machine-readable instructions executable by a digital processing apparatus to perform a method for predicting the onset of a failure in equipment, the method comprising the following operations:

receiving data regarding the equipment;

making assessments regarding the data, wherein the operation of making assessments regarding the data further comprises making assessments regarding features;

applying at least one behavioral operator;

analyzing the data, wherein the operation of analyzing the data comprises detecting if there are any anomalies in the data;

outputting results;

receiving feedback concerning system performance; and adjusting at least one parameter based on the feedback received concerning system performance, wherein the at least one parameter is a parameter of a machine learning method.

* * * * *